United States Patent [19]

Brenneman et al.

[11] 4,262,066

[45] Apr. 14, 1981

[54] SUNLIGHT RECHARGEABLE STORAGE CELL

[75] Inventors: Robert K. Brenneman, Brookline; Norman N. Lichtin, Newton Center, both of Mass.

[73] Assignee: The Trustees of Boston University, Boston, Mass.

[21] Appl. No.: 103,096

[22] Filed: Dec. 13, 1979

[51] Int. Cl.³ .......................... H01M 6/30; H01M 6/36
[52] U.S. Cl. ..................................................... 429/111
[58] Field of Search ........................................ 429/111

[56] References Cited

U.S. PATENT DOCUMENTS

| | | | |
|---|---|---|---|
| 3,114,658 | 12/1963 | Zaromb | 429/111 X |
| 3,255,044 | 6/1966 | Powers et al. | 429/111 X |
| 4,064,326 | 12/1977 | Manassen et al. | 429/111 |
| 4,085,257 | 4/1978 | Witzke | 429/111 |
| 4,118,546 | 10/1978 | Witzke et al. | 429/111 |
| 4,128,704 | 12/1978 | McKinzie et al. | 429/111 |
| 4,138,532 | 2/1979 | Chen | 429/111 |
| 4,172,925 | 10/1979 | Chen et al. | 429/111 |

OTHER PUBLICATIONS

J. Manaseen et al., "Photoelectrochemical Storage Systems: The Importance of the Second & Third Electrodes," Semiconductor Liquid–Junction Solar Cells, pp. 34–37, Published by The Electrochemical Society, Princeton, N.J. (1977).
J. M. Mountz et al. "The Photogalvanovolhaic Cell", Solar Energy, vol. 21, pp. 291–295 (1978).
M. D. Archer, "Electrochemical Aspects of Solar Energy Conversion", J. Applied Electrochem., vol. 5, pp. 17–38 (1975).
E. Rabinowitch, "The Photogalvanic Effect," J. Chem. Phys., vol. 8, pp. 551–566 (1940).
H. Silverman et al., "Solar Regenerative Fuel Cell System," Proceedings 14th Annual Power Sources Conf., (1960), pp. 72–75.
V. Srinivasan et al., "Photochemical Reduction of Thionne by Cobatt (II) EDTA Complex in $H_2O$–Ether Emulsion," J. Chem. Phys., vol. 32, pp. 1165–1168 (1970).
W. D. Clark et al., "Photogalvanic Cells," Solar Energy, vol. 17, pp. 147–150 (1975).
D. E. Hall et al., "A Multilayer Iron–Thionine Photogalvanic Cell," J. Electrochem. Soc., vol. 123, pp. 1705–1707 (1976).
D. E. Hall et al., "Electrodic Phenomena at the Anode of the Totally Illuminated Thin Layer Iron–Thionine Photogalvanic Cell," J. Electrochem. Soc., vol. 125, pp. 1365–1371 (1978).
N. Lichtin, "Photogalvanic Processes," Chapter 5 in Solar Power & Fuels, Academic Press (1977).

Primary Examiner—Aaron Weisstuch
Attorney, Agent, or Firm—Hamilton, Brook, Smith & Reynolds

[57] ABSTRACT

In a rechargeable storage cell, the photoredox reaction and regenerating reaction of a photoredox couple in one half-cell provide the driving force for producing charged state redox couples in both first and second half-cells separated by an ion selective permeable membrane. In the primary embodiment, a thionine dye photoreacts with ferrous ions in the first dye containing half-cell to oxidize those ions. The reduced form of the dye then reacts via a selective electrode in the first half-cell connected to an electrode in the second half-cell to reduce ferric ions in the second, dye-free half-cell. When the second half-cell electrode is then connected to a first half-cell electrode which is reversible to the iron ions, the concentration cell formed by the above reactions can be discharged through a load by the redox reaction of the iron ions.

15 Claims, 2 Drawing Figures

SUNLIGHT RECHARGEABLE STORAGE CELL

DESCRIPTION

Technical Field

This invention relates to electrical storage cells and in particular to such cells which are directly charged and recharged by incident radiation such as sunlight.

BACKGROUND ART

Electrical power generated in either photovoltaic or photogalvanic transducers can be stored in auxiliary systems. For example, the transducers can be used to charge lead acid batteries, to electrolyze water or to drive pumps used to store water in an elevated basin.

The pioneering work of Eugene Rabinowitch accomplished photogalvanic transduction in a thionine-iron cell with two identical platinum electrodes, one illuminated and the other in the dark. *Journal of Chemical Physics*, Vol. 8, pp 560–566, 1940. A device configuration with greater potential efficiency which also offers the attractive possibility of being developed into a practical area device is the totally-illuminated thin-layer transducer first described by Clark and Eckert, *Solar Energy*, Vol. 17, pp 147–150, 1975. In such transducers, at least one electrode is selective, undergoing rapid electron exchange with one redox couple while largely blocking electron exchange with the other. In the Clark-Eckert transducer, the dye couple reacts rapidly at an n-type tin oxide anode while electron transfer with iron ions is effectively blocked, presumably because the redox potential of the ferric/ferrous couple falls in the gap between the conduction and valence bands of the semiconductor electrode.

Published studies on photogalvanic conversion have been almost entirely limited to various approaches to transduction such as noted above, but the possibility of intrinsic storage has been recognized. For example, a typical photogalvanic converter depends on the generation of an energy rich photostationary state in an electrolyte and the continuous relaxation of the state toward dark equilibrium by electron transfer through an external circuit. It has been suggested that by inhibiting the relaxation of the photostationary state, power can be stored until relaxation is permitted. Srinivasan et al., *The Journal of Chemical Physics*, Vol. 52, pp 1165–1168, 1970. Srinivasan et al. suggested the photoreduction of thionine by cobalt (II)-EDTA. The back reaction between cobalt (III)-EDTA and leucothionine was largely prevented by extracting the leuco dye into ether. A significant disadvantage of such a storage system is that the dye is itself the storage element; thus any breakdown of the dye with age results in loss of storage.

Thionine has also been suggested for use in a fuel cell system. Silverman et al., *Proceedings of the 14th Annual Power Sources Conference in Fort Monmouth, N.J.*, pp 72–75, 1960. In that fuel cell system, a dye such as thionine was photoreduced in a regenerator. The leuco dye was then allowed to react at an electrode in a dye regenerating reaction. By means of the photoreduction and regenerating reaction, charged redox states of reagents were obtained in two electrolyte solutions. The solutions were then pumped to a fuel cell and were permitted to undergo a redox reaction in the dark. For recharging, the solution was returned to the illuminated regenerator.

An object of the present invention is to provide an electrical storage cell having structural simplicity near to that of conventional lead acid storage cells yet which can be recharged by direct illumination. A further object of this invention is to provide such a storage cell which does not require that a portion of the cell be retained in a dark environment. Yet another object of this invention is to provide such a cell that does not require that the photostationary state of a photoredox couple be maintained to retain the cell in the charged state.

DISCLOSURE OF THE INVENTION

The present invention relates to an improvement in a rechargeable storage cell of the type having a membrane which is selectively permeable to ions separating the storage cell into half-cells. Redox couples in electrolytic solution are provided in each half-cell. During cell discharge, electrodes in each half-cell transfer electrical charge with redox reaction of the redox couples. In accordance with the invention, a selective, charging electrode is provided in the first half-cell. In one form that electrode does not readily exchange electrons with the above-mentioned redox couple, but it does react with a photoredox couple in the solution. The cell is charged by a photoredox reaction and a dye regenerating reaction; the photoredox reaction is with the redox couple in one half-cell, and the regenerating reaction is with the redox couple in the other half-cell. By providing both a selective, charging electrode and a discharge electrode in one of the half-cells, the cell can be conveniently charged or discharged. Current can be drawn during the charging cycle as well as during the discharge cycle.

Because the second cell can be free of dye, it is not necessary that the cell be retained in a dark environment.

In accordance with a preferred embodiment of the invention, thionine dye is photoreduced to leucothionine in a reaction with an iron redox couple in a first half-cell. Leucothionine then reacts through the selective electrode to reduce an iron redox couple in the second half-cell while thionine dye is regenerated. A thionine-plated tin oxide electrode is a preferred selective electrode.

BRIEF DESCRIPTION OF THE DRAWINGS

The foregoing and other objects, features and advantages of the invention will be apparent from the following more particular description of illustrative embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION OF EMBODIMENTS OF THE INVENTION

Figure 1:
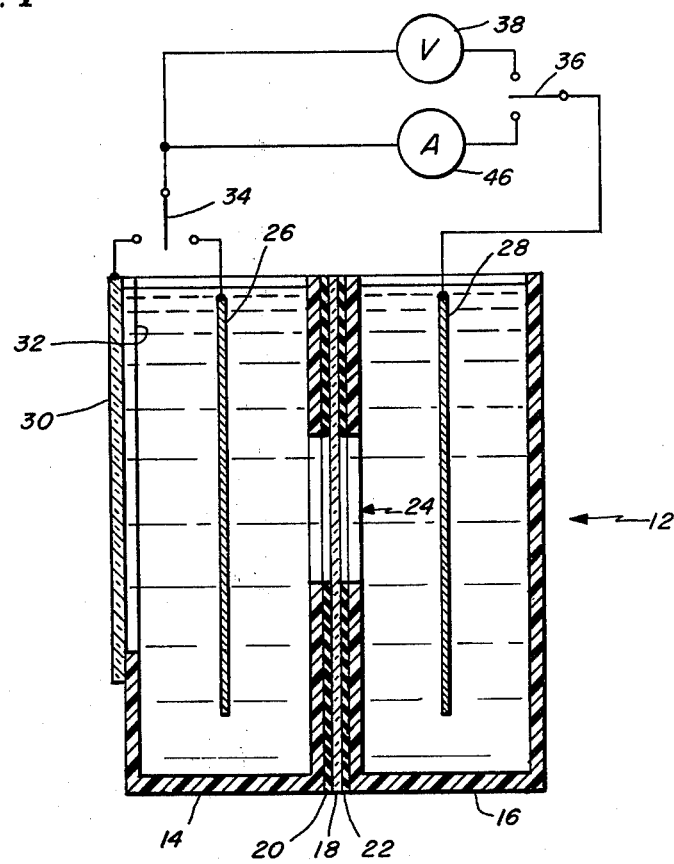
FIG. 1 is a perspective view partially broken away showing the construction of a test cell embodying this invention.

A rechargeable storage cell 12 embodying this invention is shown in FIG. 1. The cell includes two half-cells 14 and 16. Each half-cell contains ferrous and ferric ions in an electrolytic medium. For an uncharged battery the ferrous/ferric couples in the two half-cells may be at the same concentration ratios. The half-cell 14 also contains a photoredox couple. In this case, that photoredox couple is thionine dye and leucothionine; hence the half-cell 14 will be referred to as the dye-containing half-cell. The concentration of iron ions is 10 to $10^5$ times that of thionine. Unless the half-cell 16 is to be retained in a dark environment, it is free of dye and will be referred to as the dye-free half-cell.

The half-cells 14 and 16 are separated by a selective permeable membrane 18 such as an ion exchange membrane. The membrane 18 is sandwiched between silicone rubber gaskets 20 and 22. The ion-exchange membrane 18 is permeable to some small ions, for example, protons or anions, but not to thionine, reduced thionine or iron ions. During charge and discharge of the cell 12, ions are transferred between the half-cells through an opening 24 and through the ion-exchange membrane 18 which spans that opening.

For discharge of the cell, two platinum gauze electrodes 26 and 28 are provided. The platinum electrodes do not block either the iron or dye couple. A selective, charging electrode 30 of tin oxide is mounted to a wall of the half-cell 14 by silicone adhesive and is exposed to the electrolytic solution through a port 32.

For purposes of testing, the electrodes may be connected by two switches 34 and 36 to a voltmeter 38 and an ammeter 46. In typical use of the storage cell, the selective, charging electrode 30 would be connected to the electrode 28 through a low-resistance path, and the electrodes 26 and 28 would be connected through a load and associated switch. For use of the cell as a transducer, electrodes 30 and 28 would be connected through the load.

Operation of the cell is as follows: During charging of the cell, the thionine in half-cell 14 reacts in a photoredox reaction with ferrous ions. The thionine is thus photoreduced to leucothionine and ferrous ions are photo oxidized to ferric ions in a complicated reaction which can be simplified to the following:

$$TH^+ + 2Fe^{2+} + 3H^+ \xrightarrow{h\nu} TH_4^{2+} + 2Fe^{3+} \quad (1)$$

Because the back reaction of leucothionine with ferric ions is relatively slow, the leucothionine can migrate to the selective electrode 30 and is there oxidized more rapidly than it can be oxidized by the ferric ions in solution. The dye regenerating reaction at the selective electrode is as follows:

$$TH_4^{2+} \rightarrow TH^+ + 2e^- + 3H^+ \quad (2)$$

This oxidation of the leucothionine frees two electrons for transfer to the second half-cell 16 where ferric ions are reduced to ferrous ions in the following reaction:

$$2Fe^{3+} + 2e^- \rightarrow 2Fe^{2+} \quad (3)$$

Thus, the net reaction is that during the photoredox reaction of thionine, ferrous ions are oxidized in the first half-cell 14; and during the dye regenerating reaction of leucothionine at the selective electrode, ferric ions are reduced in the second half-cell 16. Thus, the concentration ratio of ferric to ferrous ions increases in the dye-containing half-cell 14 and decreases in the dye-free half-cell 16.

To complete the loop of charge transfer, anions migrate from or protons migrate into the dye-free half-cell 16 to or from the dye-containing half-cell 14 through the semipermeable membrane 18.

The resultant gradient in the ferric/ferrous ratio between the two half-cells results in a chemical potential difference between the two half-cells. The two platinum gauze electrodes 26 and 28 do not block electron exchange with ferric and ferrous ions. If they are connected across a load, there is a tendency to balance the concentration ratio in the two half-cells by a transfer of electrons from the second half-cell 16 to the first half-cell 14 in a redox reaction such as is found in conventional concentration-type storage cells. To complete the charge-transfer loop during discharge, anions or protons flow through the membrane 18 as before but in the opposite direction.

Current can be drawn through the load even during charging of the storage cell. However, because the platinum electrode does not block the dye couple, a small potential from the photoreduced dye would oppose discharge of the cell if the cell were illuminated during discharge. Thus, the efficiency of discharge can be increased by providing some means, not shown, for blocking light during discharge and, of course, preventing charging during a discharge mode.

Because the dye only provides a driving force and is not the storage element, its breakdown with age does not affect storage. It can readily be replaced for charging as needed.

Because the electrode 26 is responsive to the iron couple, the thionine dye at low concentrations in the dye containing half-cell 14 has little influence on the discharge voltage of the cell, and that influence can be further reduced by blocking light during discharge. The voltage of the cell is Nernstian during discharge:

$$E_{cell} = E_{DC} - E_{DF} = .06 \log \frac{([Fe^{3+}]/[Fe^{2+}])_{DC}}{([Fe^{3+}]/[Fe^{2+}])_{DF}} \quad (4)$$

wherein brackets indicate concentration, the numerator is the concentration ratio for the dye-containing half cell and the denominator is the concentration ratio for the dye-free half cell. Assuming that, in the uncharged battery,

$$[Fe^{3+}]_{DC} = [Fe^{2+}]_{DC} = [Fe^{2+}]_{DF} = [Fe^{3+}]_{DF} = C_o \quad (5)$$

and that $[Fe^{3+}]_{DC}$ and $[Fe^{2+}]_{DF}$ increase by d during charging while $[Fe^{2+}]_{DC}$ and $[Fe^{3+}]_{DF}$ decrease by the same amount, the open circuit voltage of the charged cell is:

$$V_{oc}^{charged} = .06 \log \frac{(C_o + d)^2}{(C_o - d)^2} \quad (6)$$

The maximum d attainable under any set of conditions depends on the ratio of leucothionine to thionine present in the dye-containing half cell under illumination, on the resulting potential developed at the dye-selective electrode, and on the ratio of ferrous to ferric ions.

It can be seen from the above discussion that the selective electrode 30 serves a rectifying function by readily directing electrons to the dye-free half-cell in a dye regenerating reaction while blocking reaction with ferric ions. Reaction with ferric ions would permit discharge of electrons from the dye-free half-cell back to the dye containing half-cell, and any resultant charging would be minimal. Thus, an underlying concept essential to this invention is that the dye in the first half-cell undergo a first photoreaction and a second dye regenerating reaction, only one of which is carried out through a selective electrode with a redox couple in the second half cell. The photoreaction may be one of either reduction or oxidation of the photoreagent. The reaction through the selective electrode may be either the regenerating reaction or the initial photoreaction, but the selective electrode must block the other of those reactions.

Prior work on the totally illuminated, thin layer (TI-TL) iron-thionine transducer provides a good background for selecting electrodes, electrolyte compositions and cell configurations. D. E. Hall W. D. K. Clark, J. A. Eckert, N. N. Lichtin and P. D. Wildes, Amer. Ceramic Soc. Bull., 56, 408–411 (1977); D. E. Hall, J. A. Eckert, N. N. Lichtin and P. D. Wildes J. Electrochem. Soc., 123, 1705–1707 (1976). Other reversibly excitable photoredox reagents which are photoreducible dyes like thionine include: phenazine dyes, such as phenosafranine; xanthene dyes, such as eosin and erythrosin; and thiazine dyes, such as thionine disulfonate, Methylene Blue, Toluidine Blue, Methylene Green, Methylene Azure, Thiocarmine R, Gentianine, C.I. Basic Blue, C.I. Basic Blue 24, and C.I. Basic Blue 25. Rhodamine B, Victoria Blue B and chlorophyll are other suitable photoreducible dyes. Thionine disulfonate has particular potential because of its high solubility.

Another suitable class of materials which may function as suitable excitable photoredox reagents is the class of photo-oxidizable absorbers of light which may also be termed dyes in a broad sense of the word. Certain transition metal complexes which can be elevated to an excited state by solar energy are included in this class. It has been demonstrated, for example, that complexes of ruthenium (II) or Osmium (II) such as tris (2,2'-bipyridine) ruthenium or tris (2,2'-bipyridine)osmium (II), can be elevated to an excited state by sunlight. Quenching of the excited state can be done with oxidizing agents, including $O_2^-$, $Fe^{3+}$, $Co(phen)^{+3}$, $Ru(NH_3)_6^{+3}$, $Os(bpy)_3^{+3}$ and $Fe(CN)_6^{-3}$. For a more comprehensive description of these transition metal complexes, see the following references, the teachings of which are hereby incorporated by reference: Lin, C. T. and Sutin, N., "Quenching of the Luminescence of the Tris (2,2'-bipyridine) complexes of Ruthenium (II) and Osmium (II), Kinetic Considerations and Photogalvanic Effects," J. Phys. Chemistry, 30, 97 (1976); and Young, R. C., Meyer, T. J., Whitten, D. G., "Kinetic Relaxation Measurement of Rapid Electron Transfer Reactions by Flash Photolysis." "The Conversion of Light Energy Into Chemical Energy Using the $Ru(bpy)_3^{3+}$— —$Ru(bpy)_3^{2+}$ Couple," J. Am. Soc. 97:16, Aug. 6, 1975. The class of substituted carbocyanine dyes are among those species of potential use as photoreducing agents.

Electrolytes can contain more than one excitable photoredox reagent. The addition of more than one photoredox dye, for example, tends to increase the range of wavelengths which is absorbed by the electrolyte. For example, thionine dye absorbs in the range of about 500 to 630 nanometers (nm), and the addition of Methylene Blue to a thionine system will extend the absorbance to about 700 nm.

Photosensitizing dyes which absorb within the solar spectrum and luminesce within the range of wavelengths absorbed by the photoredox reagents can also be used to increase the sunlight engineering efficiency of charging for the cell. See the U.S. Pat. No. 4,052,536 to Lichtin et al.

To maximize the oxidation or reduction of redox couples in each of the half-cells with a given incidence of light, an adequate concentration of thionine in the photostationary state under illumination must be provided, and adequate path length must be provided to enable absorption of virtually all light in the wavelength regions of the absorption band. And the electrode configuration must permit diffusion of leucothionine to the selective electrodes in less time than is required for bulk back reaction of the leucothionine with ferric ions.

Photostationary steady-state concentrations of ferric ions in the dye-containing half-cell which are 10 to 1,000 times those in the TI-TL transducer require electrolyte compositions which minimize the specific rate of oxidation of leucothionine by ferric ions in the bulk.

For this particular embodiment, the selective electrode material must be selected such that the material is sufficient for the interconversion of leucothionine and thionine, such that it blocks the iron couple, does not catalyze back reaction of leucothionine with ferric ions and is stable under cell conditions. Although thionine-plated tin oxide selective electrodes have been used most successfully, uncoated tin oxide and n-type titanium dioxide electrodes have also been used. The titanium dioxide may, for example, be coated as a thin layer over titanium or some other conductor. Also, thionine coated on other conductors or semiconductors will serve as a selective electrode.

The material for the redox electrodes 26 and 28 must also be stable under all conditions of use. Further, each should be reversible to the particular redox couple in the respective half cell. Although platinum gauze electrodes have been used for the discharge electrode in the dye-containing half-cell and for the electrode in the dye-free half-cell, other electrodes such as tin oxide doped with antimony also have potential for use with iron ions.

The permeable membrane should allow passing of selected ions but should not pass or react with the dye. For use with a thionine-iron cell, an MA3475 ion exchange membrane manufactured by IONAC Chemical Company and a 5025 membrane manufactured by RAI Research Corp. have been used successfully.

Figure 2:
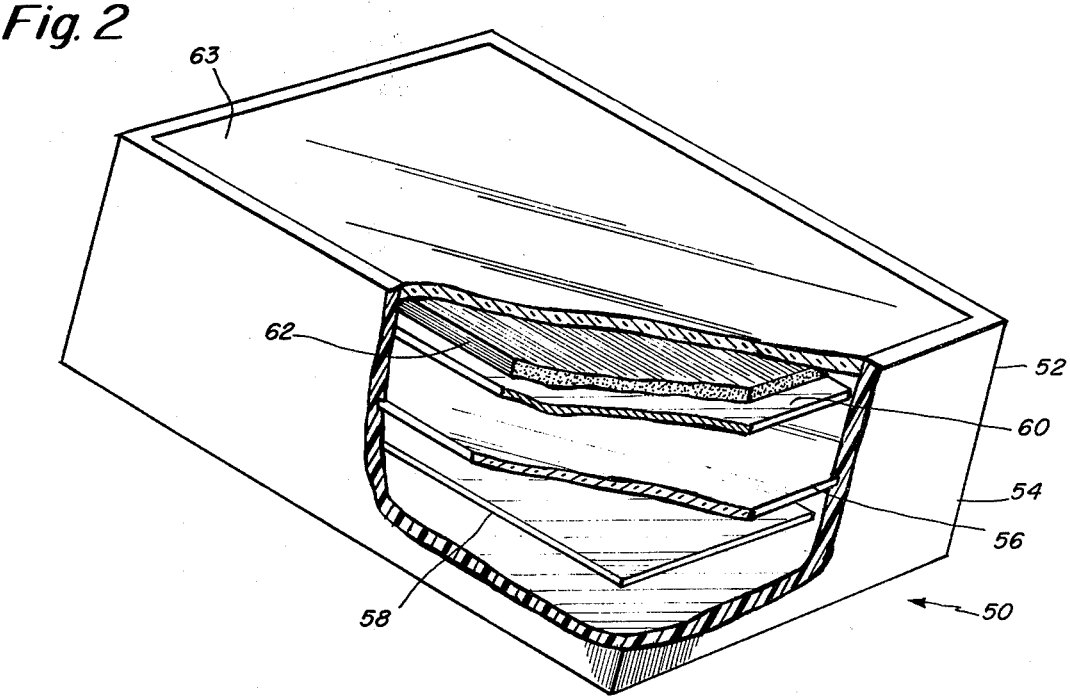
FIG. 2 is a perspective view of an alternative embodiment of the invention.

FIG. 2 shows another embodiment of the invention. The cell 50 is divided into half cells 52 and 54 by an ion exchange membrane 56 as before. Also, electrodes 58 and 60, reversible to the redox couples in the electrolytic solution are positioned in each half cell. A selective, charging electrode 62 of material compatable with the photoredox couple, is positioned against a transparent face 63 of the illuminated half-cell 52. The electrode 62 is transparent so that it passes the incident radiation and it has many interstices. This provides for a large area of selective electrode very near to illuminated dye which undergoes the photoredox reaction.

In the case shown, the electrode 62 is in a bristle configuration. The bristles may, for example, be transparent plastic and be coated with a thin layer of electrode material such as tin oxide or titanium dioxide. As noted above, that structure may then be be coated with thionine. Other electrode structures which fill the volume between the transparent face 63 and discharge electrode 60 and which provide an extended surface area include glass wool coated with electrode material and pleated cloth similarly coated.

EXAMPLE 1

A storage cell as shown in FIG. 1 was constructed using a thionine-plated tin oxide selective electrode and platinum gauze iron redox electrodes. A two centimeter diameter opening 24 was provided and the selective electrode was exposed through a port 32 of dimensions 2 cm×4.2 cm. Each half-cell was 6 cm tall×5 cm side×1 cm deep. The electrolyte in each half-cell was a solution of 0.01 molar ferrous sulfate and 0.001 molar ferric sulfate in sulfuric acid having a pH of 1.7 to 2.0. The dye-containing half-cell 14 was 0.0001 molar in thionine acetate. Twenty-three milliliters of solution were provided in each half-cell. An MA3475 ion exchange membrane was used.

The storage cell was tested as follows. With light off and with the electrode 26 removed from the cell, the switch 34 was connected to the selective electrode 30. With the voltmeter and ammeter alternately connected by switch 36, the voltmeter had a reading of 0.1 mV and the ammeter had a reading of 0.05 $\mu A$.

The cell was then illuminated from the left as viewed in FIG. 1 by a tungsten bulb ten inches from the selective electrode 30. The radiation from the bulb was filtered by an infrared blocking filter and an ultraviolet blocking filter and focused on the selective electrode by a lens. The light intensity at the cell was 45 to 50 mW/cm$^2$. With switch 36 switched over to the voltmeter 38 and switch 34 connected to selective charging electrode 30, the voltage under essentially open circuit conditions was $-81.5$ mV. The selective electrode was negative with respect to the electrode in the dye-free half-cell. This was the driving potential provided by the reduced form of the dye with incident radiation.

With the lamp still on, the switch 36 was connected to the ammeter to effectively short circuit the electrodes 28 and 30. The short circuit was maintained until the concentration of ferric ions in the dye-containing side increased by $2.73\times10^{-4}$ M. The initial ammeter reading was $-9.6$ $\mu A$ from the dye-containing side to the dye-free side. From the above discussion it should be recognized that this current resulted from the oxidation of the leucothionine in a redox reaction with the ferric ions in the dye-free side via the selective electrode.

With the cell thus charged, the light was turned off and switch 36 was moved to the voltmeter 38 to provide an essentially open circuit. A platinum gauze electrode was placed in the dye-containing side with the switch 34 connected to that electrode. The voltmeter read $+10.9$ mV due to the increase in the ratio of concentration of ferric ions to concentration of ferrous ions in the dye-containing side relative to the dye-free side.

With the light still off, the cell comprising electrodes 26 and 28 was effectively short circuited through the ammeter by setting switch 36. This short circuit was retained until the ferric ion concentration in the dye-free side increased by $1.5\times10^{-4}$ M. The initial short-circuit current was $+9.10$ $\mu A$.

With the light still off, the circuit was effectively opened by connecting switch 36 to the voltmeter 38. The voltage reading was $+2.5$ mV. This indicated that the cell had not yet returned completely to its original state. The 2.5 mV value was in close agreement with the value calculated by means of the Nernst equation using changes in concentrations during charging and discharging.

EXAMPLE 2

The cell of Example 1 was modified by a fresh solution of $9.4189\times10^{-3}$ molar ferrous sulfate and $1.6421\times10^{-4}$ molar ferric sulfate in sulfuric acid having a pH of 1.85. The dye containing half-cell was $9.2\times10^{-5}$ molar in thionine acetate. New thionine-plated tin oxide and platinum gauze charging electrodes and a new MA3475 ion exchange membrane were used. The resulting device provided an open circuit voltage of $-140$ millivolts, dye-containing side negative with respect to dye-free side, and a peak charging current of $-187$ microamps which leveled off to $-34.3$ microamps after three minutes.

While the invention has been particularly shown and described with reference to illustrative embodiments thereof, it will be understood by those skilled in the art that various changes in form and details may be made therein without departing from the spirit and scope of the invention as defined by the appended claims.

We claim:

1. In a rechargeable storage cell of the type having an ion-selective permeable membrane separating the storage cell into first and second half-cells, an electrolytic solution in each half-cell, a first redox couple in the fist half-cell solution and a second redox couple in the second half-cell solution, and at least one electrode in each of the half-cells for connection in a citrcuit to transfer electrical charge from one half-cell to the other via redox reaction during discharge of the storage cell, the improvement comprising:
   a selective, charging electrode in the first half-cell which does not readily exchange electrons with the first redox couple, said charging electrode being electrically connectible to an electrode of said second half-cell; and
   a photoredox couple in the first half-cell which undergoes a photoredox reaction when illuminated and a regenerating reaction to generate a charged-cell redox states of the first couple and, via the selective electrode, charged cell redox states of the second couple.

2. A rechargeable storage cell as claimed in claim 1 that cell being a concentration cell in which the first and second redox couples are the same.

3. A rechargeable storage cell as claimed in claim 2 wherein the photoredox couple is a photooxidizing dye which is reduced by the first redox couple when illuminated and then reacts via the selective electrode to reduce the second redox couple.

4. A rechargeable storage cell as claimed in claim 3 wherein the photo oxidizing dye is thiazine dye.

5. A rechargeable storage cell as claimed in claim 4 wherein the photo oxidizing dye is thionine and the first and second redox couples comprise ferrous and ferric ions.

6. A rechargeable storage cell as claimed in claim 1 or 4 in which the selective electrode comprises tin oxide.

7. A rechargeable storage cell as claimed in claim 6 wherein the tin oxide selective electrode is thionine-plated.

8. A rechareable storage cell as claimed in claim 1 or 4 in which the selective electrode comprises n-type titanium dioxide.

9. A rechargeable storage cell as claimed in claim 8 wherein the selective electrode is thionine plated.

10. A rechargeable storage cell as claimed in claim 1 or 4 wherein the selective electrode comprises thionine plated conductor or semiconductor.

11. A rechargeable storage cell as claimed in claim 1 or 4 wherein the second cell is free of photoredox couple.

12. A rechargeable storage cell as claimed in claim 1 wherein the photoredox couple is a photo oxidizing dye which is reduced by the first redox couple when illuminated and then reacts via the the selective electrode to reduce the second redox couple.

13. A rechargeable storage cell as claimed in claim 1 wherein the selective electrode provides an extended surface area.

14. A rechargeable storage cell as claimed in claim 13 wherein the selective electrode is formed of transparent bristles coated with electrode material.

15. In a storage cell having first and second half-cells separated by an ion-selective permeable membrane, a first redox couple in the first half-cell and a second redox couple in the second half-cell, means for charging the storage cell comprising:
 a selective charging electrode in the first half-cell which does not readily exchange electrons with the first redox couple, said charging electrode being electrically connectible to an electrode of said second half-cell; and
 a photoredox couple in the first half-cell which undergoes a photoredox reaction when illuminated and a regenerating reaction to generate charged-cell redox states of the first couple, and, via the selective electrode, charged cell redox states of the second couple.

* * * * *